J. J. SÉGUIER.
GRIDIRON.
APPLICATION FILED JUNE 20, 1916.
1,327,258.
Patented Jan. 6, 1920.
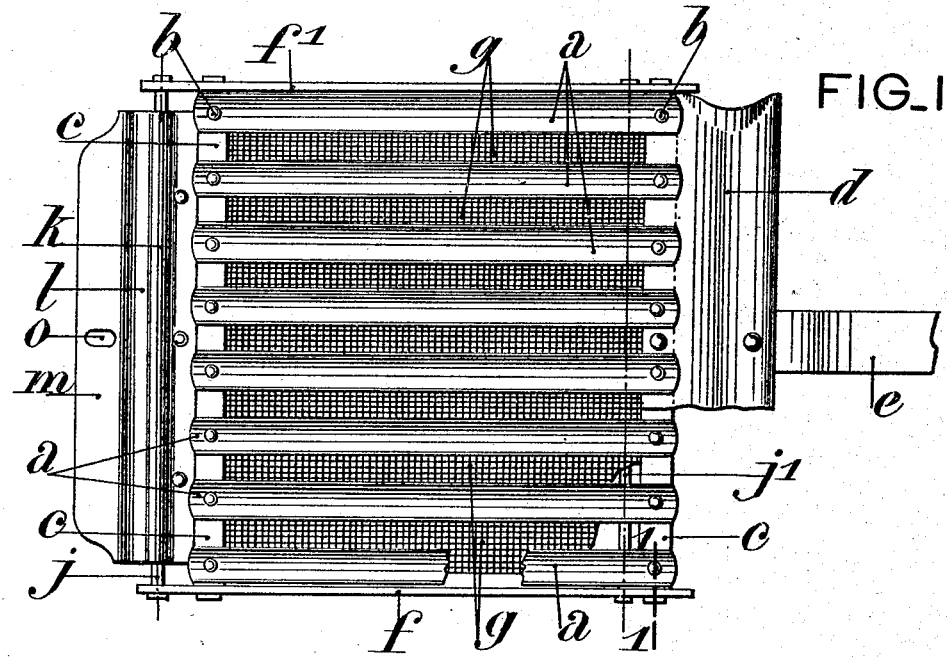
FIG. 1
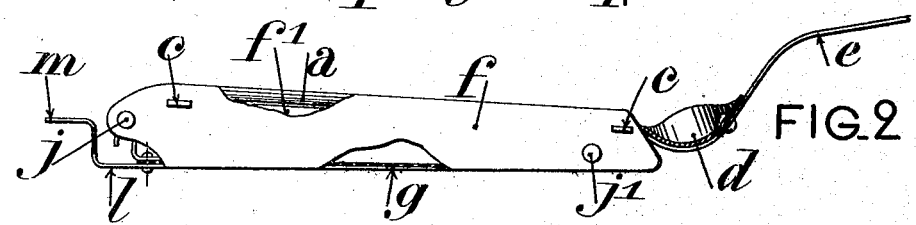
FIG. 2
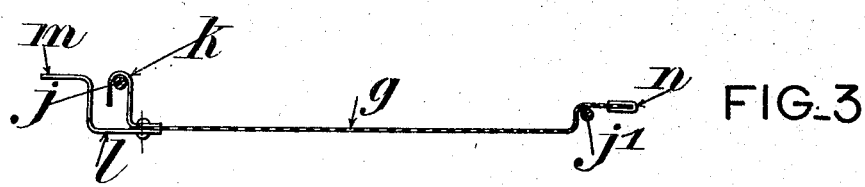
FIG. 3
FIG. 4   FIG. 5   FIG. 6
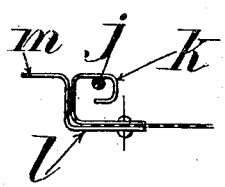 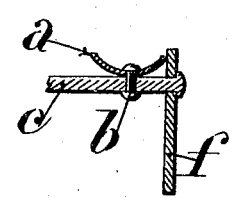 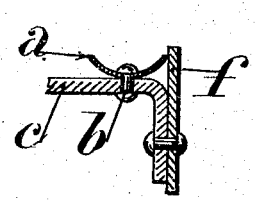
Witnesses
Jean Fermain
Pierre Faure
Inventor
Jean Jacques Séguier with parts

UNITED STATES PATENT OFFICE.

JEAN JACQUES SÉGUIER, OF CASTRES, FRANCE.

GRIDIRON.

1,327,258.  Specification of Letters Patent.  Patented Jan. 6, 1920.

Application filed June 20, 1916. Serial No. 104,672.

*To all whom it may concern:*

Be it known that I, JEAN JACQUES SÉGUIER, a citizen of the French Republic, residing at Castres, in France, have invented certain new and useful Improvements in Gridirons, of which the following is a specification.

The invention relates to grid-irons, more especially grid-irons adapted for grilling or boiling meat upon a gas stove of the type wherein a supplementary grid with very small apertures is placed below the main grid bars, but spaced apart therefrom, this supplementary grid being usually in direct contact with the flames.

The invention is illustrated in the accompanying drawings, in which—

Figure 1 is a plan view, with certain portions broken away.

Fig. 2 is a side view, also with parts broken away.

Fig. 3 is a side view of the lower grid, and

Fig. 4 shows another form of device for supporting one end of this grid.

Figs. 5 and 6 are sections on the line 1—1 of Fig. 1 showing two forms of support for the main grid bars.

Like references denote like or equivalent parts throughout the drawings.

In the drawings $a$ designates the trough-shaped bars of the grid, which are fixed by rivets $b$ to cross-bars $c$. A trough $d$, with a handle $e$ projecting therefrom, is fixed to one of the cross-bars $c$. The cross-bars $c$ are fixed to two lateral wall members $f$, $f^1$, two methods of fixing being shown in Figs. 5 and 6 respectively. In Fig. 5 the end of the bar $c$ passes through the wall, and is up-set outside the wall; in Fig. 6 the bar $c$ is bent down and riveted to the wall $f$. The walls $f$, $f^1$ extend slightly beyond the bars $a$ at the front and rear of the grid-iron, and also rise slightly above the level of the said bars. The cross-bars $c$ are fixed to the walls at such levels as to give the bars $a$ a suitable downward slope from the rear to the front of the grid-iron. The walls are made as low as possible in front, but are still of sufficient height to hold the meat on the bars $a$ clear of a wire net or grid $g$ placed under the bars.

The walls $f$, $f^1$ serve to prevent loss of heat at the sides of the grid-iron, and loss of heat in front is prevented by the trough $d$. This trough $d$ may, however be dispensed with, the side walls being bent or curved round in front of the grid-iron to form a kind of frame which is only open at the rear of the grid-iron.

The walls $f$, $f^1$ are connected to each other by rods $j$, $j^1$ supporting the grid $g$ already referred to. The grid $g$ has fixed to its rear edge a bent plate $k$, whereby it is hooked on to the rod $j$. Fig. 3 shows the plate $k$ substantially S shaped, and Fig. 4 shows it bent to hook over the rod from the rear. Another plate bent into Z shape, is fixed with its lower part $l$ to the rear edge of the grid, its upper part $m$ forming a handle. At its front edge the grid $g$ is bent upward to rest on the rod $j^1$, and this edge is protected by a strip of sheet metal $n$. The grid $g$ is substantially flush with the bottom edges of the walls $f$, $f^1$.

For inserting the grid $g$ shown in Fig. 3 the front edge thereof is first laid upon the rod $j^1$, and the grid is pushed forward as far as the bent part thereof will allow; the rear edge is then lifted, and the plate $k$ is hooked on to the rod $j$.

The handle $m$ has a hole $o$ enabling the grid $g$ to be hung up separately on a nail or the like.

The grid $g$ may consist of fine steel wire, or any other metal which will resist the temperature of the flames and does not give off fumes or vapor at red heat. It may also consist of a perforated plate, but I prefer to use wire netting, as giving better results.

When the grid $g$ has been inserted it is practically impossible for it to fall out in any position of the grid-iron, because the walls retain it at the sides, and the trough $d$ retains it in front.

What I claim as my invention and desire to secure by Letters Patent of the United States is:—

In a grid-iron the combination of a series of grid bars, two side walls parallel with said grid bars forming supporting feet for the grid-iron and extending beyond the extremities of said grid bars, two transverse bars connecting said side walls and upon which the extremities of the grid bars are supported, two transverse rods connecting said walls, a detachable wire gauze sheet of fine mesh substantially level with the bottom edges of said side walls and having its front edge bent upward to rest on one of said transverse rods a hook shaped plate attached to and extending along the rear edge of said wire gauze sheet and adapted to be hooked over the other of said transverse rods a second bent plate attached to and extending along said rear edge of said gauze sheet and forming a handle for detaching the same, a gravy trough extending across the front side of the grid-iron and the handle attached to said gravy trough.

In witness whereof I have signed this specification in the presence of two witnesses.

JEAN JACQUES SÉGUIER.

Witnesses:
   JEAN GERMAIN,
   PIERRE FAURE.